US012677030B1

(12) United States Patent (10) Patent No.: US 12,677,030 B1

Kandpal (45) Date of Patent: Jul. 7, 2026

(54) LEVERAGING AUDIO MATCHES TO IMPROVE VISUAL MATCHING RECALL BETWEEN VIDEO CONTENT ITEMS

(71) Applicant: GOOGLE LLC, Mountain View, CA (US)

(72) Inventor: Mayank Kandpal, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 19/057,539

(22) Filed: Feb. 19, 2025

(51) Int. Cl.
 H04N 21/439 (2011.01)
 G06V 10/74 (2022.01)
 H04N 21/81 (2011.01)
(52) U.S. Cl.
 CPC ....... H04N 21/4394 (2013.01); G06V 10/761 (2022.01); H04N 21/8106 (2013.01)
(58) Field of Classification Search
 CPC .......................... H04N 21/4394; G06V 10/761
 See application file for complete search history.

(56) References Cited

U.S. PATENT DOCUMENTS 9,275,427 B1 * 3/2016 Sharifi .................. G06V 20/46
2024/0414418 A1 * 12/2024 Banipal .............. H04N 21/8547

* cited by examiner

*Primary Examiner* — Michael H Hong
(74) *Attorney, Agent, or Firm* — Young Basile Hanlon & MacFarlane, P.C.

(57) ABSTRACT

Audio matching is performed between a first video content item and a second video content item to identify a matching audio segment. First temporal boundaries within the first video content item and second temporal boundaries within the second video content item corresponding to the identified matching audio segment are identified. A visual matching between the first video content item within the first temporal boundaries and the second video content item within the second temporal boundaries is performed using a modified visual similarity threshold that is lower than a baseline visual similarity threshold. Whether a match exists between the first and second video content items is determined based on the visual matching.

20 Claims, 7 Drawing Sheets

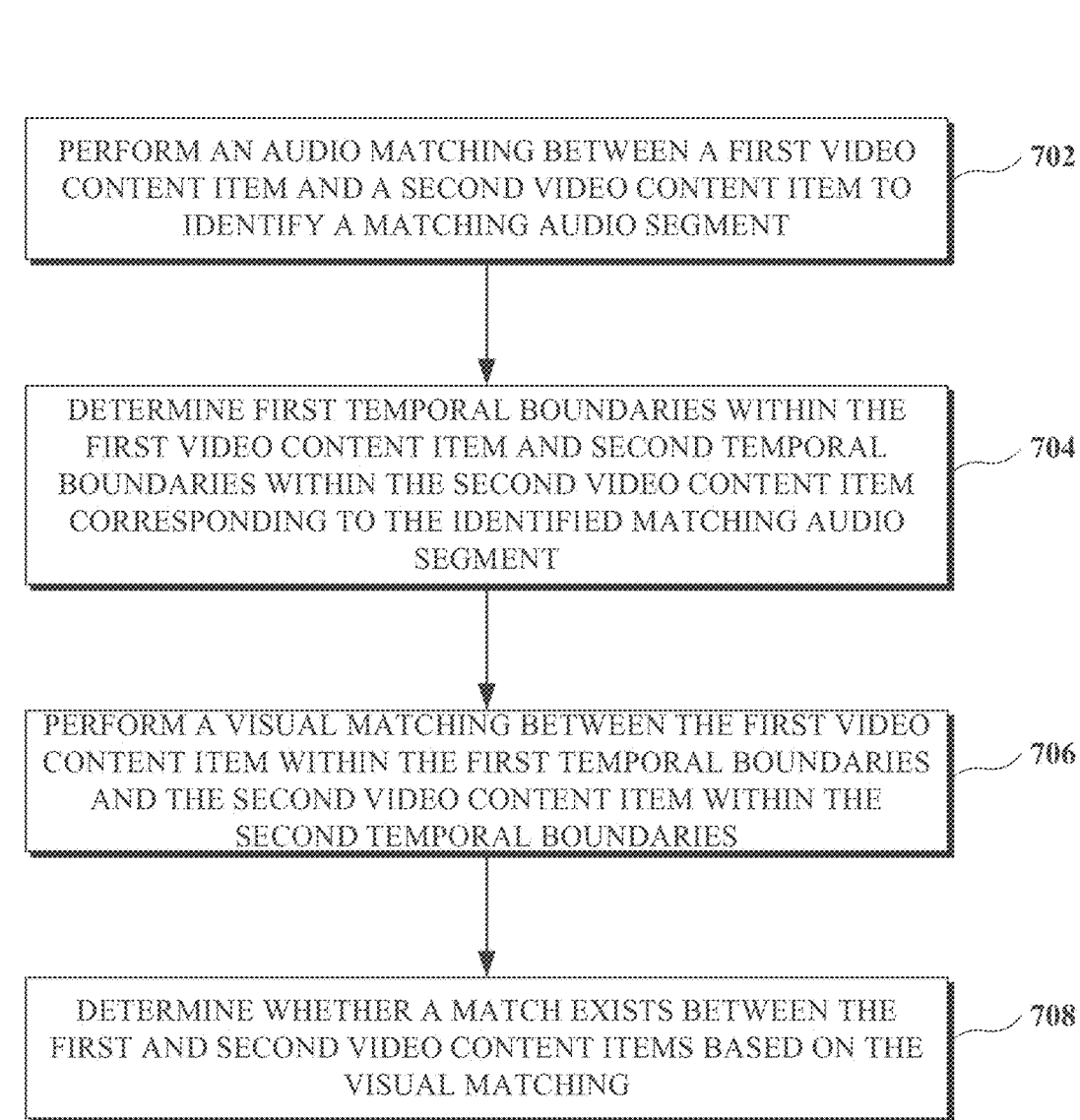

700

PERFORM AN AUDIO MATCHING BETWEEN A FIRST VIDEO CONTENT ITEM AND A SECOND VIDEO CONTENT ITEM TO IDENTIFY A MATCHING AUDIO SEGMENT — 702

DETERMINE FIRST TEMPORAL BOUNDARIES WITHIN THE FIRST VIDEO CONTENT ITEM AND SECOND TEMPORAL BOUNDARIES WITHIN THE SECOND VIDEO CONTENT ITEM CORRESPONDING TO THE IDENTIFIED MATCHING AUDIO SEGMENT — 704

PERFORM A VISUAL MATCHING BETWEEN THE FIRST VIDEO CONTENT ITEM WITHIN THE FIRST TEMPORAL BOUNDARIES AND THE SECOND VIDEO CONTENT ITEM WITHIN THE SECOND TEMPORAL BOUNDARIES — 706

DETERMINE WHETHER A MATCH EXISTS BETWEEN THE FIRST AND SECOND VIDEO CONTENT ITEMS BASED ON THE VISUAL MATCHING — 708

FIG. 7

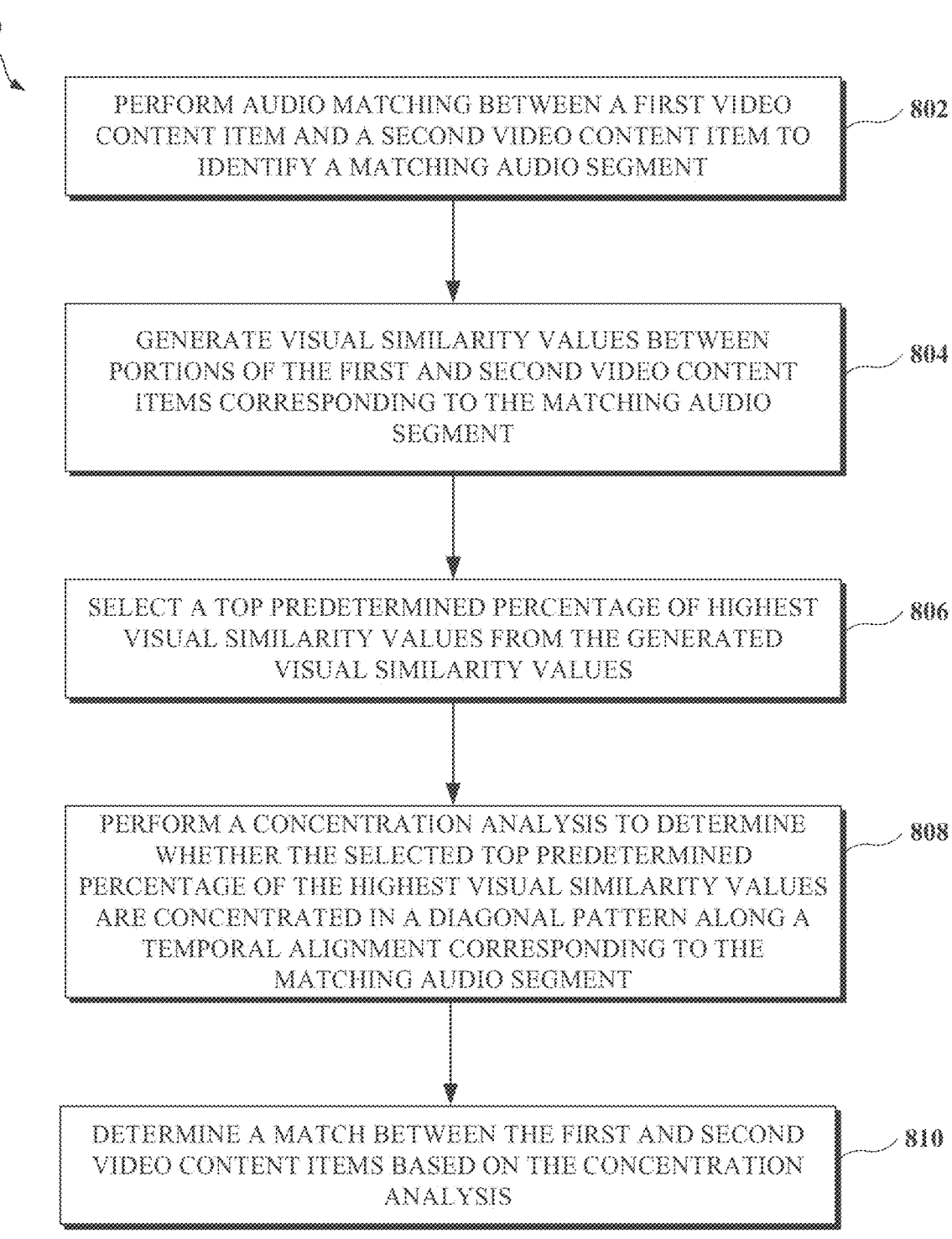

800

PERFORM AUDIO MATCHING BETWEEN A FIRST VIDEO CONTENT ITEM AND A SECOND VIDEO CONTENT ITEM TO IDENTIFY A MATCHING AUDIO SEGMENT — 802

GENERATE VISUAL SIMILARITY VALUES BETWEEN PORTIONS OF THE FIRST AND SECOND VIDEO CONTENT ITEMS CORRESPONDING TO THE MATCHING AUDIO SEGMENT — 804

SELECT A TOP PREDETERMINED PERCENTAGE OF HIGHEST VISUAL SIMILARITY VALUES FROM THE GENERATED VISUAL SIMILARITY VALUES — 806

PERFORM A CONCENTRATION ANALYSIS TO DETERMINE WHETHER THE SELECTED TOP PREDETERMINED PERCENTAGE OF THE HIGHEST VISUAL SIMILARITY VALUES ARE CONCENTRATED IN A DIAGONAL PATTERN ALONG A TEMPORAL ALIGNMENT CORRESPONDING TO THE MATCHING AUDIO SEGMENT — 808

DETERMINE A MATCH BETWEEN THE FIRST AND SECOND VIDEO CONTENT ITEMS BASED ON THE CONCENTRATION ANALYSIS — 810

FIG. 8

LEVERAGING AUDIO MATCHES TO IMPROVE VISUAL MATCHING RECALL BETWEEN VIDEO CONTENT ITEMS

BACKGROUND

Content matching plays a significant role in various applications, including copyright enforcement, content moderation, and media retrieval, by enabling the identification of similarities between different media items such as videos and audio recordings. With the increasing volume of user-generated content (UGC) and the widespread availability of editing tools, content can be transformed in ways that make conventional detection methods insufficient.

SUMMARY

A first aspect is a method that includes performing an audio matching between a first video content item and a second video content item to identify a matching audio segment; determining first temporal boundaries within the first video content item and second temporal boundaries within the second video content item corresponding to the identified matching audio segment; performing a visual matching between the first video content item within the first temporal boundaries and the second video content item within the second temporal boundaries using a modified visual similarity threshold that is lower than a baseline visual similarity threshold; and determining whether a match exists between the first and second video content items based on the visual matching.

A second aspect is a system that includes one or more memories and one or more processors. The one or more processors configured to execute instructions stored in the one or more memories to perform an audio matching between a first video content item and a second video content item to identify a matching audio segment; determine first temporal boundaries within the first video content item and second temporal boundaries within the second video content item corresponding to the identified matching audio segment; perform a visual matching between the first video content item within the first temporal boundaries and the second video content item within the second temporal boundaries using a modified visual similarity threshold that is lower than a baseline visual similarity threshold; and determine whether a match exists between the first and second video content items based on the visual matching.

A third aspect is one or more non-transitory computer readable media storing instructions operable to cause one or more processors to perform operations that include performing an audio matching between a first video content item and a second video content item to identify a matching audio segment; determining first temporal boundaries within the first video content item and second temporal boundaries within the second video content item corresponding to the identified matching audio segment; performing a visual matching between the first video content item within the first temporal boundaries and the second video content item within the second temporal boundaries using a modified visual similarity threshold that is lower than a baseline visual similarity threshold; and determining whether a match exists between the first and second video content items based on the visual matching These and other aspects of the present disclosure are disclosed in the following detailed description of the embodiments, the appended claims and the accompanying figures.

BRIEF DESCRIPTION OF THE DRAWINGS

The description herein makes reference to the accompanying drawings described below, wherein like reference numerals refer to like parts throughout the several views.

FIG. 7 is a flowchart of an example of a technique associated with leveraging audio matches to improve visual matching recall between video content items.

FIG. 8 is a flowchart of an example of another technique associated with leveraging audio matches to improve visual matching recall between video content items.

DETAILED DESCRIPTION

Figure 1:
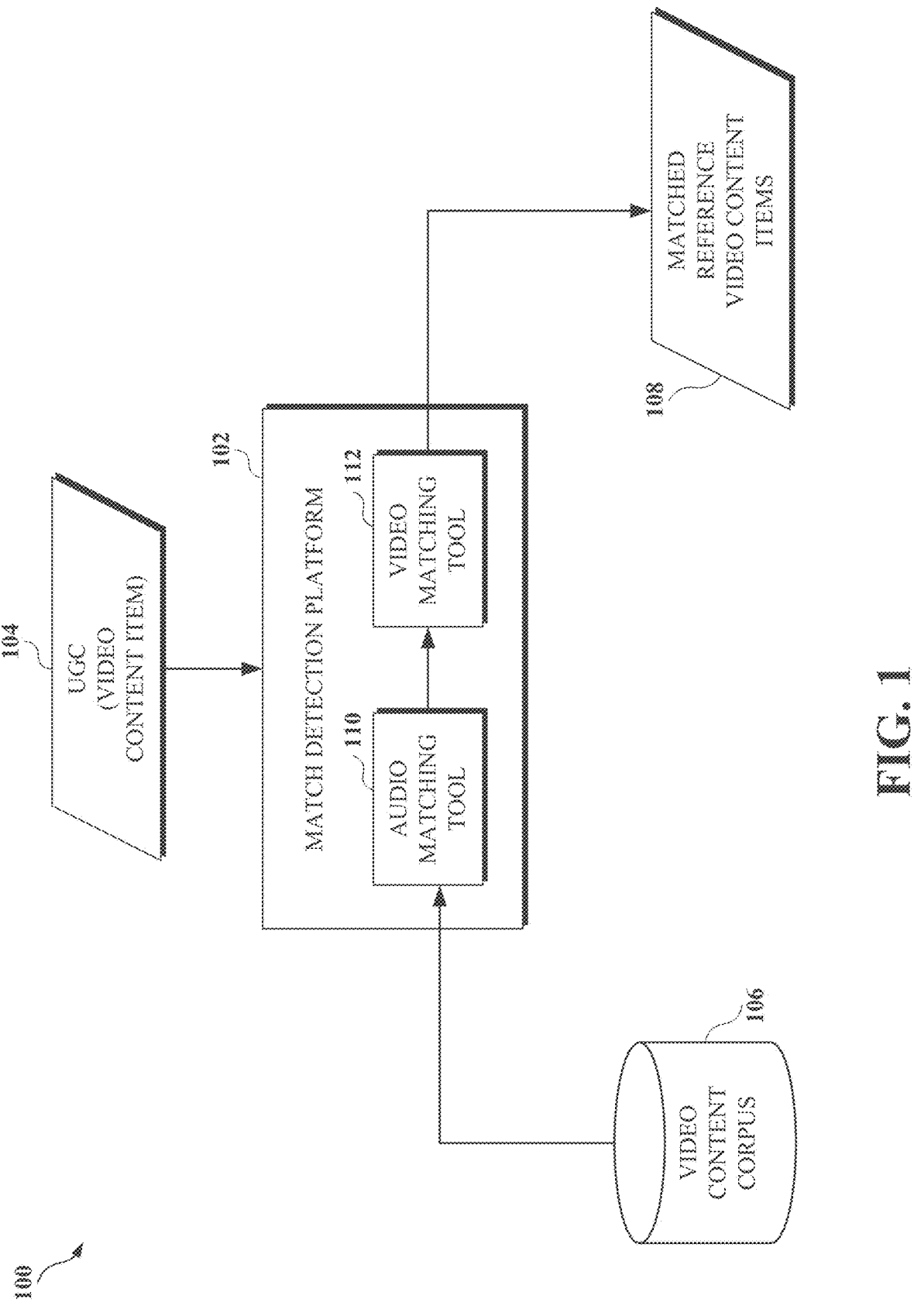
FIG. 1 illustrates a block diagram of an example of a content matching system.

Content recognition and matching systems are increasingly important for digital platforms, such as those that host UGC. These systems rely on sophisticated computer-implemented technologies to detect duplicate or derivative content by comparing newly uploaded media against authoritative sources. While current systems can effectively match exact duplicates, they face significant technical challenges when processing content that has undergone visual modifications such as off-center cropping, overlays, and zoom effects, even when the audio content remains unchanged. Such transformations present significant obstacles to traditional visual matching techniques, leading to decreased recall rates.

Modern content-matching systems typically operate with independent processing pipelines for visual and audio data, utilizing specialized fingerprinting algorithms tailored to each modality. Some approaches merge independent voice and video match scores into an aggregate similarity measure; however, they often fail to account for transformations in visual content, such as cropping, overlays, and non-central framing. This siloed approach limits the system's ability to harness audio cues to guide visual matching effectively, leading to suboptimal detection accuracy and inefficient resource allocation.

Conventional content matching approaches that analyze visual and audio data independently are often inadequate in identifying transformed or modified content. Visual analysis without audio context struggles to detect matches when visual elements have been altered, even if the audio remains unchanged. This separation increases computational demands by requiring exhaustive searches across high-dimensional feature spaces while reducing matching accuracy. By leveraging audio-based evidence to focus visual matching efforts, systems can more efficiently allocate computational resources and improve detection performance by narrowing the search space to relevant temporal regions.

Implementations of this disclosure address the limitations of conventional content matching systems by leveraging audio matching to refine the visual search space within video content items. Specifically, audio matching between first and second video content items may be used to identify corresponding audio segments, thereby defining a targeted search space within the visual domain. This search space may correspond to a diagonal band within a visual heatmap, reflecting the temporal alignment of the matching audio segments. Visual similarity data within the defined search space may be filtered by retaining only the top percentile of similarity values, thereby reducing noise and focusing analysis on the most relevant regions. The system then analyzes the filtered data to detect clusters of high similarity values along the diagonal band, indicating potential visual matches. By constraining visual matching operations within these boundaries and applying a modified visual similarity threshold, the system can efficiently classify regions as matches based on the density and distribution of high similarity values.

As used herein, the term "temporal boundaries" includes, but is not limited to, regions within a visual heatmap corresponding to temporally aligned segments of video content. For example, temporal boundaries may comprise diagonal bands within the heatmap where matching audio segments are detected, with the width of these bands being dynamically adjusted based on audio match characteristics.

This technical solution improves upon existing video matching technologies by introducing an intelligent search space reduction technique that leverages audio matching to focus visual analysis on the most promising temporal regions. Such an approach significantly reduces computational overhead by filtering similarity data to retain only the most relevant comparisons, while maintaining high recall rates through clustered similarity analysis. The disclosed implementations enable efficient detection of visually modified content by combining temporal alignment information from audio matches with targeted analysis of visual similarity patterns, particularly in cases involving complex transformations like non-central crops, overlays, and zoom effects.

Further details of techniques for leveraging audio matches to improve visual matching recall between video content items are described herein with initial reference to a system in which they can be implemented. FIG. 1 illustrates a block diagram of an example of a content matching system 100 implemented using one or more computing devices, which can be configured as described with respect to FIG. 2. The one or more computing devices may be cloud-based resources, distributed computing systems, or combinations thereof. The content matching system 100 includes a match detection platform 102 configured to process, for example, UGC video content items, such as the UGC video content item 104 to identify matching reference content from a video content corpus 106, ultimately producing matched reference video content items 108.

In some implementations, the UGC video content item 104 may be or include various types of video content, such as social media videos, video shorts, streaming content, downloaded content, or any other form of digital video content. In certain implementations, the UGC video content item 104 may be received through a content upload interface, a content sharing platform, or other digital content distribution channels.

The UGC video content item 104 may be or include at least a portion of a reference video content included in the video content corpus 106 that has undergone one or more transformations. Such transformations may include, but are not limited to, visual transformations (e.g., non-central cropping, scaling, zoom effects, overlay additions), temporal transformations (e.g., speed adjustments, segment reordering), or combinations thereof. The audio portion of the UGC video content item 104 may remain substantially unchanged even when the visual portion has been significantly transformed such that traditional video matching techniques would not be able to identify a match between the UGC video content item 104 and the corresponding reference video content in the video content corpus 106.

The video content corpus 106 may be or include a database or distributed storage system containing reference video content items against which UGC video content item 104 is compared. In some implementations, the video content corpus 106 may include authorized or verified versions of content, original source content, licensed content, or other authoritative content sources. The video content corpus 106 may be organized using various indexing schemes, such as fingerprint-based indices, temporal indices, or content-based classification systems, to facilitate efficient searching and matching operations.

The comparing and matching operations between the UGC video content item 104 and the video content corpus 106 (e.g., video content items therein) may be performed for various content management applications. Such applications may include, but are not limited to: detecting potential unauthorized reuse or distribution of copyrighted content, identifying derivative works for rights management purposes, enabling content monetization systems to properly attribute revenue, detecting misappropriated content, enabling content authentication systems to verify original sources, supporting content recommendation systems by identifying related content, facilitating content curation by identifying duplicate or near-duplicate content, enabling content attribution systems to credit original creators, supporting brand safety initiatives by identifying modified versions of approved content, and enabling content tracking systems to monitor content distribution patterns. Additionally, in some implementations, the matching operations may support automated content moderation systems, help maintain content integrity across distribution platforms, or facilitate content licensing compliance verification. The matching operations may also enable content owners to manage their intellectual property rights by identifying potential licensing opportunities or detecting unauthorized modifications of their content.

The match detection platform 102 includes tools, such as programs, subprograms, functions, routines, subroutines, operations, executable instructions, and/or the like for, inter alia, performing audio and visual content matching, defining targeted search spaces based on audio similarity, filtering visual similarity data, and classifying regions based on clustered similarity values, as further described below. At least some of the tools of the match detection platform 102 can be implemented as respective software programs that may be executed by one or more computing devices. A software program can include machine-readable instructions that may be stored in a memory, and that, when executed by a processor, may cause the computing device to perform the instructions of the software program. The match detection platform 102 may include an audio matching tool 110 and a video matching tool 112 that work in coordination to identify potential matches between the UGC video content item 104 and video reference content in the video content corpus 106.

In some implementations, the audio matching tool 110 may analyze audio components using various techniques such as audio fingerprinting, spectral analysis, or melody matching. The audio matching tool 110 may generate audio similarity metrics, identify temporal boundaries of matching audio segments, and provide this information to the video matching tool 112 to guide subsequent visual analysis.

The video matching tool 112 may receive temporal alignment information and matching audio segment locations from the audio matching tool 110 to define focused search regions for visual similarity analysis. In some implementations, the video matching tool 112 may implement transformation-tolerant video matching techniques that can identify matching content even when the visual content has undergone substantial modifications. Such techniques may include generating visual heatmaps representing frame-to-frame similarities between content items, analyzing diagonal bands corresponding to temporally aligned segments identified through audio matching, and applying thresholding techniques to identify visual matches despite modifications such as off-center cropping, overlays, or zoom effects. For example, the transformation-tolerant matching may account for spatial transformations (e.g., non-central crops, scaling operations), visual alterations (e.g., text overlays, filters, brightness/contrast adjustments), or temporal modifications while maintaining matching accuracy. The video matching tool 112 may filter similarity data to retain top percentile matches within the identified search regions and analyze the distribution of high similarity values to detect potential matches, enabling matching even in cases where traditional rigid matching techniques may fail to identify corresponding content.

In addition to identifying a matched reference video content item 108, the match detection platform 102 may output supplementary information such as temporal alignment data indicating precise locations where matching transformed content appears within reference videos. The supplementary information may also include a confidence score associated with the detected match. The supplementary information may also include a characterization of types of transformations detected (e.g., spatial transformations, visual alterations, temporal modifications, or combinations thereof). In some implementations, the match detection platform 102 may also generate metadata describing the nature of matches, such as whether they represent full or partial matches, and the specific temporal segments where matches occur. The supplementary information and metadata may be used by downstream content management systems for content tracking, rights management, or content monetization purposes.

The match detection platform 102 may be activated when conventional matching techniques fail to identify potential matches. For example, traditional visual fingerprinting methods may fail when content has undergone significant visual modifications such as non-central cropping, extensive overlay addition, or complex spatial transformations. In some implementations, the match detection platform 102 may serve as a high-recall matching system that complements existing matching techniques such as exact hash matching, perceptual hashing, or feature-based matching systems. As already mentioned, the match detection platform 102 can identify matches in cases where audio content remains relatively unchanged while visual content has been substantially modified.

The matched reference video content items 108 output by the match detection platform 102 may include various forms of matching information, such as identifiers of matching reference content, temporal alignment data, modification characterization, and confidence metrics. In some implementations, this output may be used for content identification, rights management, duplicate detection, or other content management applications. The match detection platform 102 may also generate detailed match reports including visualizations of matching regions, analysis of modification patterns, and temporal mapping between UGC and reference content.

Figure 2:
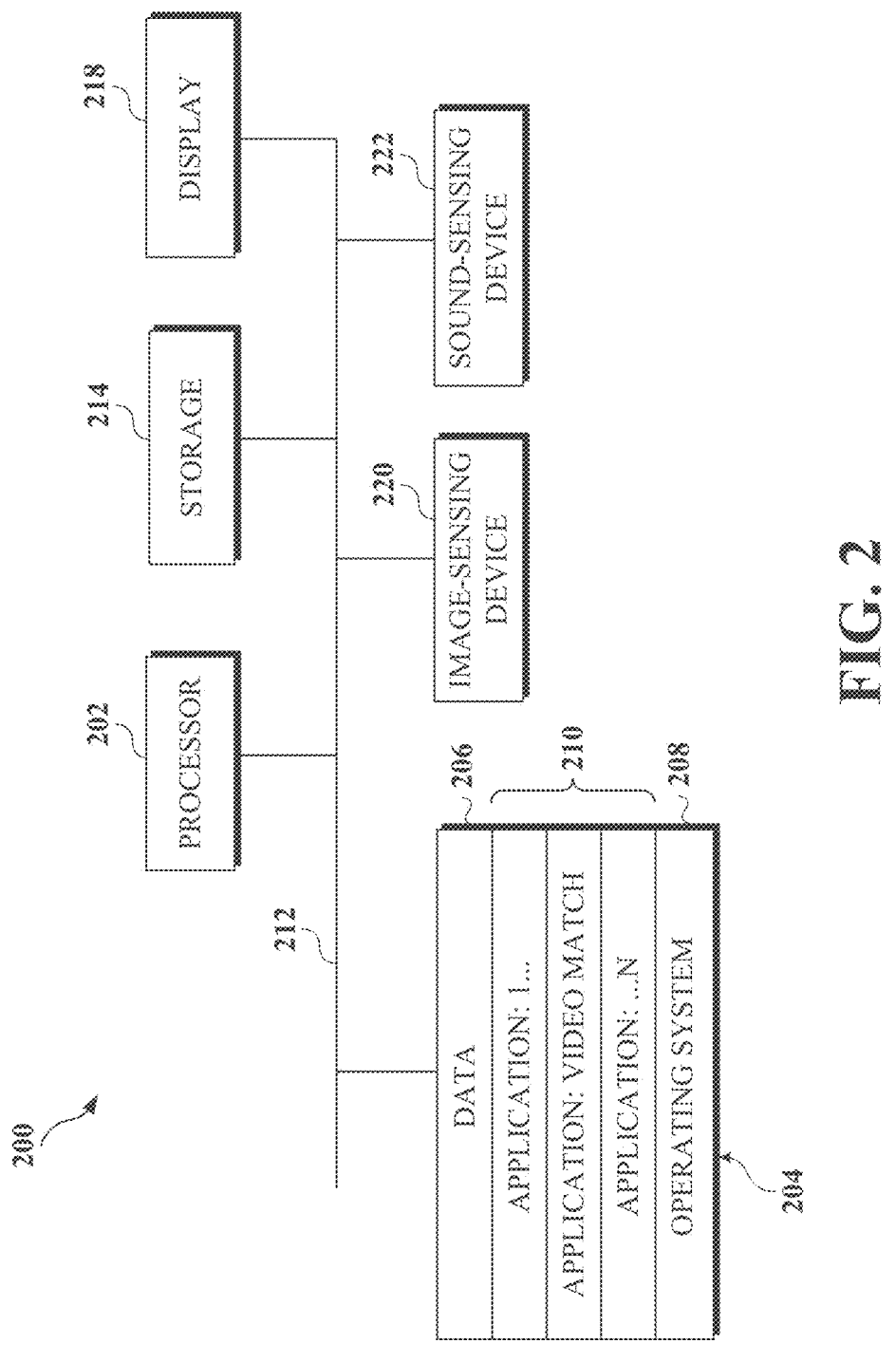
FIG. 2 is a block diagram of an example of a computing device that can implement at least some aspects of the match detection platform of FIG. 1.

FIG. 2 is a block diagram of an example of a computing device 200 that can implement at least some aspects of the match detection platform 102 of FIG. 1. For example, the computing device 200 can implement one or both of the audio matching tool 110 or the video matching tool 112 of FIG. 1. The computing device 200 can be in the form of a computing system including multiple computing devices, or in the form of one computing device, for example, a mobile phone, a tablet computer, a laptop computer, a notebook computer, a desktop computer, and the like.

A processor 202 in the computing device 200 can be a conventional central processing unit. Alternatively, the processor 202 can be another type of device, or multiple devices, capable of manipulating or processing information now existing or hereafter developed. For example, although the disclosed implementations can be practiced with one processor as shown (e.g., the processor 202), advantages in speed and efficiency can be achieved by using more than one processor.

A memory 204 in computing device 200 can be a read only memory (ROM) device or a random access memory (RAM) device in an implementation. However, other suitable types of storage device can be used as the memory 204. The memory 204 can include code and data 206 that is accessed by the processor 202 using a bus 212. The memory 204 can further include an operating system 208 and application programs 210, the application programs 210 including at least one program that permits the processor 202 to perform the techniques described herein. For example, the application programs 210 can include applications 1 through N, which further include tools, techniques, or applications that perform the techniques described herein related to or in association with leveraging audio matches to improve visual matching recall between video content items. The computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the processor 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display, or a light emitting diode (LED) display, such as an organic LED (OLED) display.

The computing device 200 can also include or be in communication with an image-sensing device 220, for example, a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the processor 202 and the memory 204 of the computing device 200 as being integrated into one unit, other configurations can be utilized. The operations of the processor 202 can be distributed across multiple machines (wherein individual machines can have one or more processors) that can be coupled directly or across a local area or other network. The memory 204 can be distributed across multiple machines such as a network-based memory or memory in multiple machines performing the operations of the computing device 200. Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

Figures 3, 4:
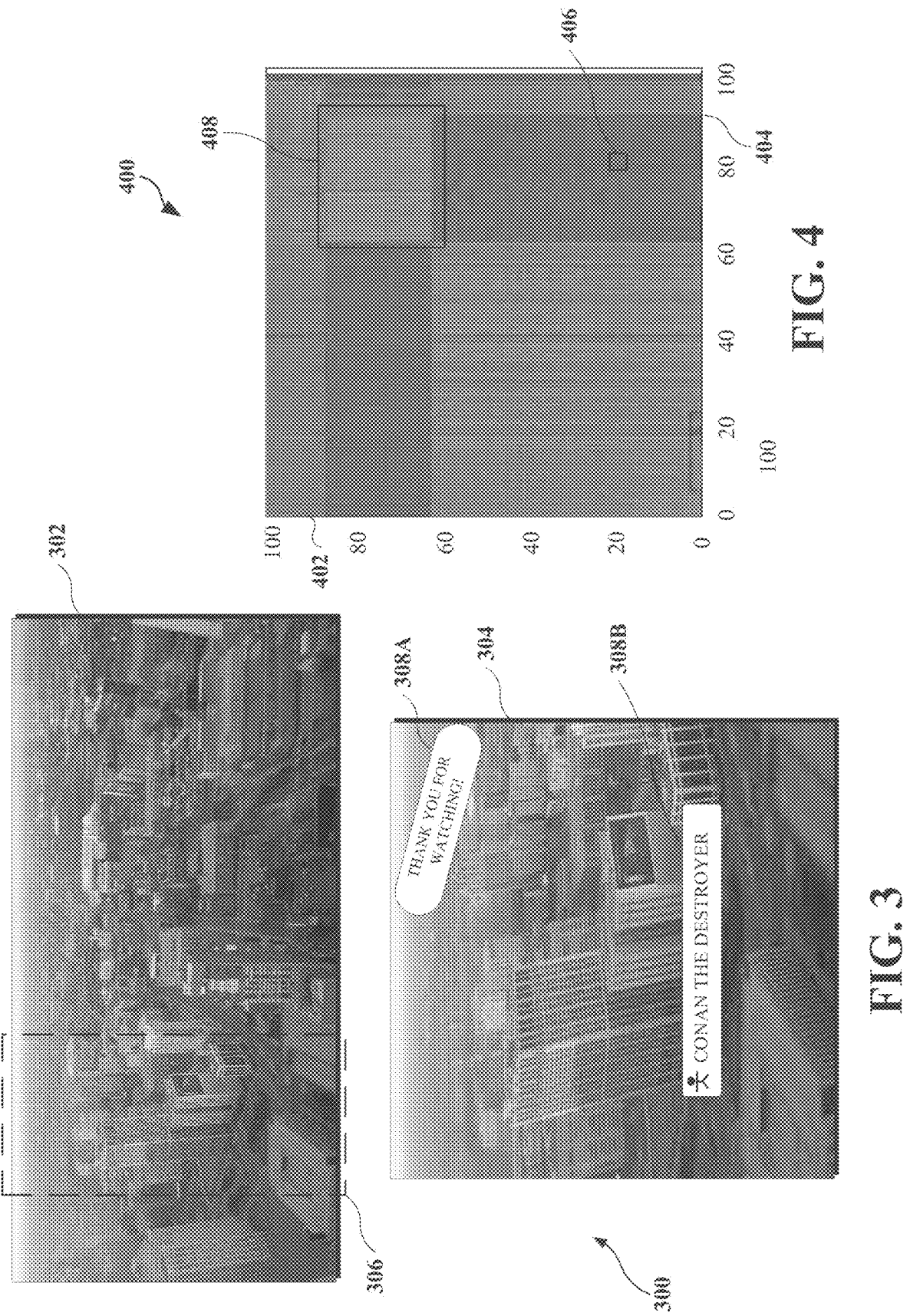
FIG. 3 illustrates an example of reference and transformed video content that may be compared by the match detection platform of FIG. 1.
FIG. 4 illustrates an example of a heatmap that may be used to compare media content items.

FIG. 3 illustrates an example 300 of reference and transformed video content that may be compared by the match detection platform 102 of FIG. 1. The example 300 includes a reference video content item 302, which may be stored in the video content corpus 106, and a corresponding UGC video content item (e.g., an UGC video content item 304), which may be received for matching analysis as the UGC video content item 104 of FIG. 1. While not visually depicted, both video content items include audio tracks that remain substantially similar despite the visual transformations shown.

The reference video content item 302 may include various types of video content, such as professionally produced content, authorized content distributions, or original source material. In the example 300, the reference video content item 302 shows an aerial view of a cityscape including multiple buildings and infrastructure. A portion 306 of the reference video content item 302, indicated by dashed lines, corresponds to a region that appears in a transformed state as the UGC video content item 304.

The UGC video content item 304 represents a transformed version of the portion 306, having undergone multiple visual transformations while maintaining substantially unchanged audio content. In the example 300, the transformations include, but are not limited to, aspect ratio distortion, zooming, and the addition of overlay elements 308A and 308B. Overlay elements may include text, graphics, animations, logos, watermarks, emoji, stickers, or other visual elements that may be superimposed on the video content.

Despite these significant visual transformations, the match detection platform 102 of FIG. 1 identifies the correspondence between the UGC video content item 304 and the reference video content item 302. This identification may be achieved through the coordinated operation of the audio matching tool 110 and video matching tool 112, as described herein. For example, the audio matching tool 110 may first identify matching audio segments between the content items, as the audio portion remains substantially unchanged. The temporal alignment information from this audio match may then guide the video matching tool 112 in performing transformation-tolerant visual matching within specific temporal regions, enabling the detection of the visual correspondence despite the presence of significant modifications such as the aspect ratio changes, zoom effects, and overlay elements 308A and 308B.

In some implementations, the match detection platform 102 may also characterize the specific transformations detected between the reference video content item 302 and the UGC video content item 304. Such characterization may include identifying the types of transformations applied (e.g., spatial transformations, overlay additions), the extent of each transformation (e.g., zoom level, aspect ratio modification values), and the temporal regions where these transformations occur. This transformation characterization may be included in the supplementary information output by the match detection platform 102 along with the match detection results.

FIG. 4 illustrates an example of a video similarity heatmap 400 that may be used to compare media content items, such as video or audio files, by visually representing similarity values between segments of the compared content. The video similarity heatmap 400 includes axes 402 and 404, representing time indices for two media items being compared, wherein axis 402 may correspond to a timeline of a first media item (e.g., the UGC video content item 104 of FIG. 1 or the UGC video content item 304 of FIG. 3) and axis 404 may correspond to a timeline of a second media item (e.g., a reference video, such as the reference video content item 302 of FIG. 3). Each unit along the axes represents a discrete segment of the media items, such as individual frames, groups of frames, or temporal segments.

The similarity values represented in the video similarity heatmap 400 may be generated by comparing standardized video fingerprints, which are compact, fixed-length representations of visual content. The fingerprints can be derived using various techniques. For example, the fingerprints can be derived using perceptual hashing of visual features, locality-sensitive hashing (LSH) of feature vectors, and/or learned binary encodings generated by neural networks trained on video content. Comparing fingerprints can utilize distance metrics appropriate for the fingerprint format, such as Hamming distance for binary fingerprints, Jaccard distance for set-based representations, and cosine similarity for high-dimensional feature vectors. These similarity values quantify the degree of correspondence between the video content items at each point in the heatmap, facilitating the identification of visually similar or transformed segments.

Point 406 represents a similarity value between the first media item at approximately segment 20 on axis 402 and the second media item at approximately segment 80 on axis 404. The intensity or shade at point 406 indicates the degree of similarity between these specific segments of the compared media items. In various implementations, the visualization may employ a spectrum of colors or shades to represent similarity values, where white may represent the highest similarity ("hottest"), followed by decreasing similarity values represented by red, pink, green, and blue (representing lowest similarity or "coldest"). In grayscale representations, higher similarity values may be represented by darker shades and lower similarity values by lighter shades. Alternative visualization schemes may employ different intensity scales, pattern densities, or other visual indicators to represent varying degrees of similarity, particularly in implementations where color representation is not available or preferred.

A characteristic feature of such heatmaps is the presence of diagonal lines (non-shown in FIG. 4) formed at approximately 45 degrees relative to the axes, which often indicate temporal alignment between matching segments of the compared media items. These diagonal patterns may emerge when there is consistent similarity between corresponding segments across multiple units, potentially indicating matching content between the media items. The diagonal patterns may be evident even when one media item has undergone transformations such as cropping, scaling, or format conversions. Again, the video similarity heatmap 400 includes no such diagonal lines because visual fingerprint matching struggles to detect similarity when the video content has undergone significant transformations such as off-center cropping, zoom effects, and overlay additions, which are present in this comparison.

Figure 5:
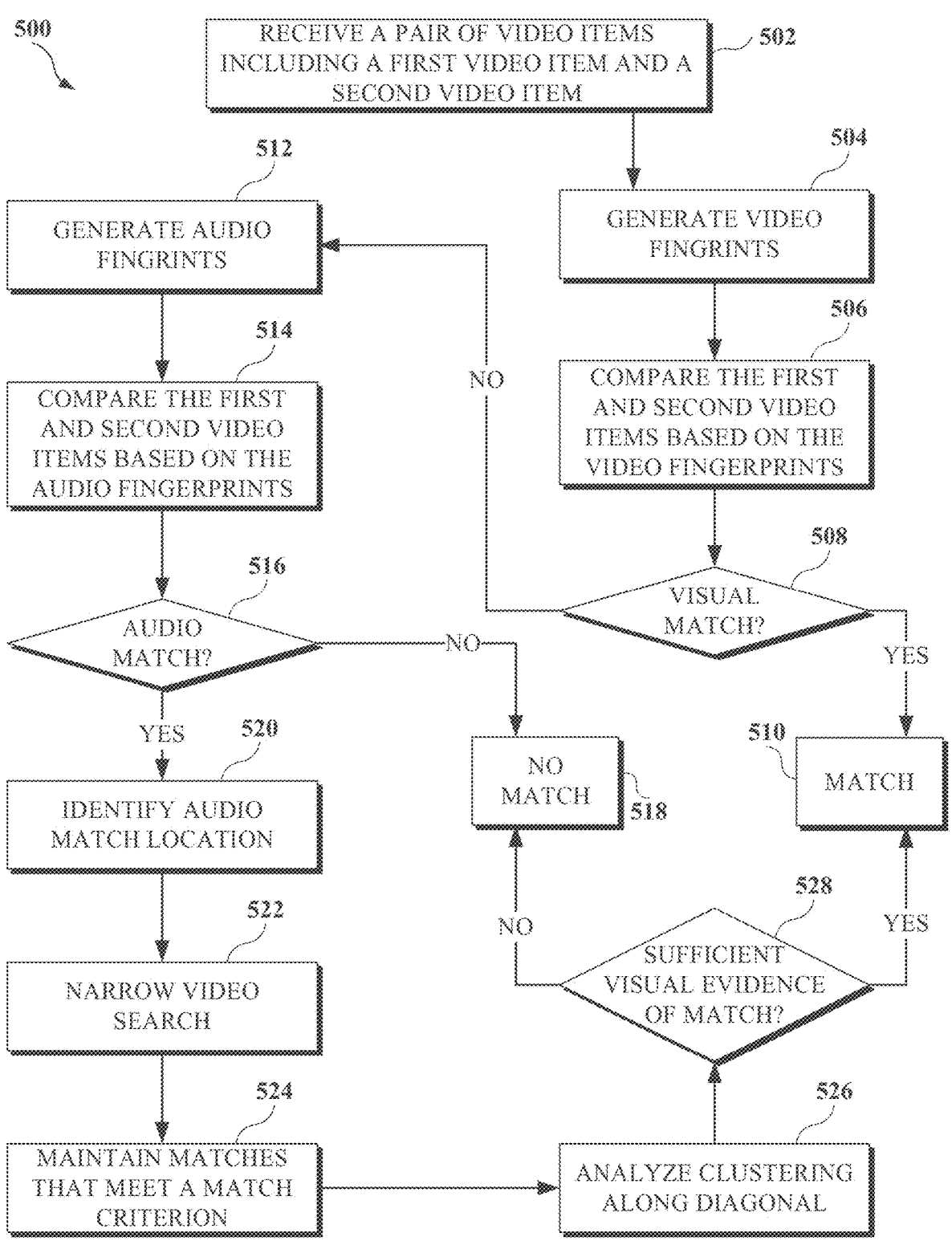
FIG. 5 is a flowchart of an example of a technique associated with leveraging audio matches to improve visual matching recall between video content items.

FIG. 5 is a flowchart of an example of a technique associated with leveraging audio matches to improve visual matching recall between video content items. The technique 500 determines whether a first video item contains portions of a reference video item that have undergone visual transformations while retaining similar audio content. These transformations may include off-center cropping, overlays, zoom effects, or other modifications that make traditional visual matching techniques ineffective The technique 500 can be executed using computing devices, such as the systems, hardware, and software described with respect to FIGS. 1-4. The technique 500 can be performed, for example, by executing a machine-readable program or other computer-executable instructions, such as routines, instructions, programs, or other code. The computer-executable instructions may be stored in a memory, such as the memory 204 of FIG. 4 and executed by a process, such as the processor 202 of FIG. 2. The steps, or operations, of the technique 500, or another technique, method, process, or algorithm described in connection with the implementations disclosed herein can be implemented directly in hardware, firmware, software executed by hardware, circuitry, or a combination thereof.

For simplicity of explanation, the technique 500 is depicted and described herein as a series of steps or operations. However, the steps or operations of the technique 500 can occur in various orders and/or concurrently. Additionally, other steps or operations not presented and described herein may be used. Furthermore, not all illustrated steps or operations may be required to implement a technique in accordance with the disclosed subject matter.

At 502, the technique 500 includes receiving a pair of video items including the first video item and the second video item. For example, the match detection platform 102 shown in FIG. 1 may receive a first video item to be analyzed (e.g., the UGC video content item 104) and a reference video item from video content corpus 106. In some implementations, the first video item may be received through a content upload interface or a content sharing platform. The second video item may be selected from a database of reference content based on preliminary matching criteria or random sampling approaches.

At 504, the technique 500 includes generating video fingerprints for the received video items. For example, the match detection platform 102 may generate feature vectors representing unique characteristics of video frames from each item. The fingerprinting process may employ various feature extraction methods such as edge detection, texture analysis, or motion pattern recognition. In some implementations, multiple types of video fingerprints may be generated to capture different aspects of the visual content. In an example, the video fingerprints of the of the reference video item may be pre-calculated and stored in a data store.

At 506, the technique 500 includes comparing the first video item and the second video item based on their respective video fingerprints. For example, the match detection platform 102 may generate a visual heatmap, similar to the video similarity heatmap 400 described with respect to FIG. 4, computing similarity values between fingerprints at different timepoints Generating a heatmap (e.g., the visual heatmap or the audio heatmap described herein) may involve producing data and/or data structures that represent or describe the heatmap. These data or data structures may be stored in a memory, such as memory 204 of FIG. 2, to facilitate further processing and analysis. The comparison may employ various distance metrics or similarity measures. Alternative implementations may use different comparison techniques such as template matching or feature correlation analysis.

At 508, the technique 500 determines whether a visual match exists between the compared items using a baseline visual similarity threshold. For example, the match detection platform 102 may analyze the heatmap for characteristic diagonal patterns indicating temporal alignment, as described with respect to FIG. 4. If a visual match is detected, the technique proceeds to 510 to declare a match. If no visual match is detected, the technique proceeds to 512 for audio-based analysis.

"Baseline visual similarity threshold" refers to a minimum similarity value typically required to establish a match between video segments when performing standard visual matching without audio-based guidance. As discussed below regarding steps 524 and 526, the system may employ a modified (lower) threshold when analyzing regions identified through audio matching, as the audio match provides additional evidence supporting a potential correspondence between the video segments.

To illustrate, and without limitations, the baseline visual similarity threshold may be such that two video segments are considered matching only when: (1) their fingerprint Hamming distances are below 0.2 across at least 80% of corresponding frames within a three-second window, (2) their perceptual hash similarities exceed 0.85 for at least 75% of frame pairs in the comparison window, or (3) their feature vector cosine similarities remain above 0.9 for a continuous sequence of at least 2.5 seconds. When operating with audio match guidance, as described herein, these thresholds may be relaxed to take into account the additional confidence provided by temporal alignment of audio features.

At 512, the technique 500 generates audio fingerprints for both video items. For example, the audio matching tool 110 may extract acoustic features or spectral characteristics from the audio tracks. The audio fingerprinting may employ various techniques such as mel-frequency analysis, acoustic fingerprinting, or temporal feature extraction. Alternative implementations may use different audio feature representations based on the specific requirements of the matching task. In an example, the audio fingerprints associated with the reference video item may be pre-computed.

At 514, the technique 500 compares the first and second video items based on their audio fingerprints. For example, an audio heatmap similar to the visual comparison process described with respect to FIG. 4 can be generated. The audio comparison may focus on different aspects such as frequency content, temporal patterns, or acoustic signatures. Alternative implementations may employ different audio comparison methods such as cross-correlation or phase analysis. At 516, the technique 500 determines whether an audio match exists. If no audio match is found, the technique 500 proceeds to 518 to declare no match. If an audio match exists, at 520, the technique 500 identifies the temporal location of the audio match. For example, the technique 500 may determine the specific timepoints or segments where the audio content aligns between the two videos.

At 522, the technique narrows the video search space based on the identified audio match location. For example, the technique 500 may define a rectangular search region around the diagonal line in the visual heatmap that corresponds to the temporal alignment identified through audio matching. This rectangular region may be formed by taking the columns and rows of the heatmap corresponding to the time periods where audio matches were detected, plus additional surrounding columns and rows to account for potential temporal misalignment or variations in playback speed. The analysis of visual similarity patterns involves examining complete columns and rows in the visual heatmap corresponding to timepoints where audio matches are detected. By analyzing the distribution of similarities across these full columns and rows, the system can identify whether the highest similarity values (e.g., top 5% of similarities) cluster along the diagonal, indicating a potential match despite visual transformations.

To illustrate, if an audio match is detected between time 10 and 30 seconds of the first video and time 10 and 45 seconds of the second video, the technique 500 may analyze the entire rectangular region of the visual heatmap encompassing these time ranges. This allows the technique 500 to look for visual similarity evidence not just along the exact diagonal where audio matches occur, but also in the surrounding temporal neighborhood where visually matching content might appear due to slight timing differences or content modifications.

At 524, the technique 500 maintains matches that meet relaxed visual matching criteria within the narrowed search space. As used herein, "relaxed visual matching criteria" refers to visual matching criteria that accepts (e.g., use) a significantly lower threshold of visual similarity compared to a baseline visual matching threshold used when performing visual matching without corresponding audio matches. The relaxed visual matching criteria may be satisfied when a concentration of visual similarities exceeds a percentage threshold within a region corresponding to the matching audio segment, even if the absolute visual similarity values are lower than would typically be required for a match determination. For example, the technique 500 may retain the top 5%, 10%, or some other predefined percentage of similarity values within the search region defined by the audio match boundaries.

At 526, the technique 500 analyzes clustering along diagonal patterns in the visual similarity data, specifically within the audio-matched regions. For example, as described with respect to FIG. 4, the match detection platform 102 may examine whether high similarity values cluster along diagonal bands in the visual heatmap. The clustering analysis may employ various techniques such as density estimation or pattern recognition. Alternative implementations may use different analytical approaches to identify and characterize clustering patterns.

At 528, the technique evaluates whether sufficient visual evidence exists within the audio-matched regions to confirm a match. This evaluation may consider factors such as the density of high similarity values, the continuity of diagonal patterns, or the strength of local matches. Based on this evaluation, the technique 500 either declares a match at 510 or no match at 518. Alternative implementations may employ different decision criteria or multi-stage evaluation processes to determine the sufficiency of visual evidence.

Figure 6:
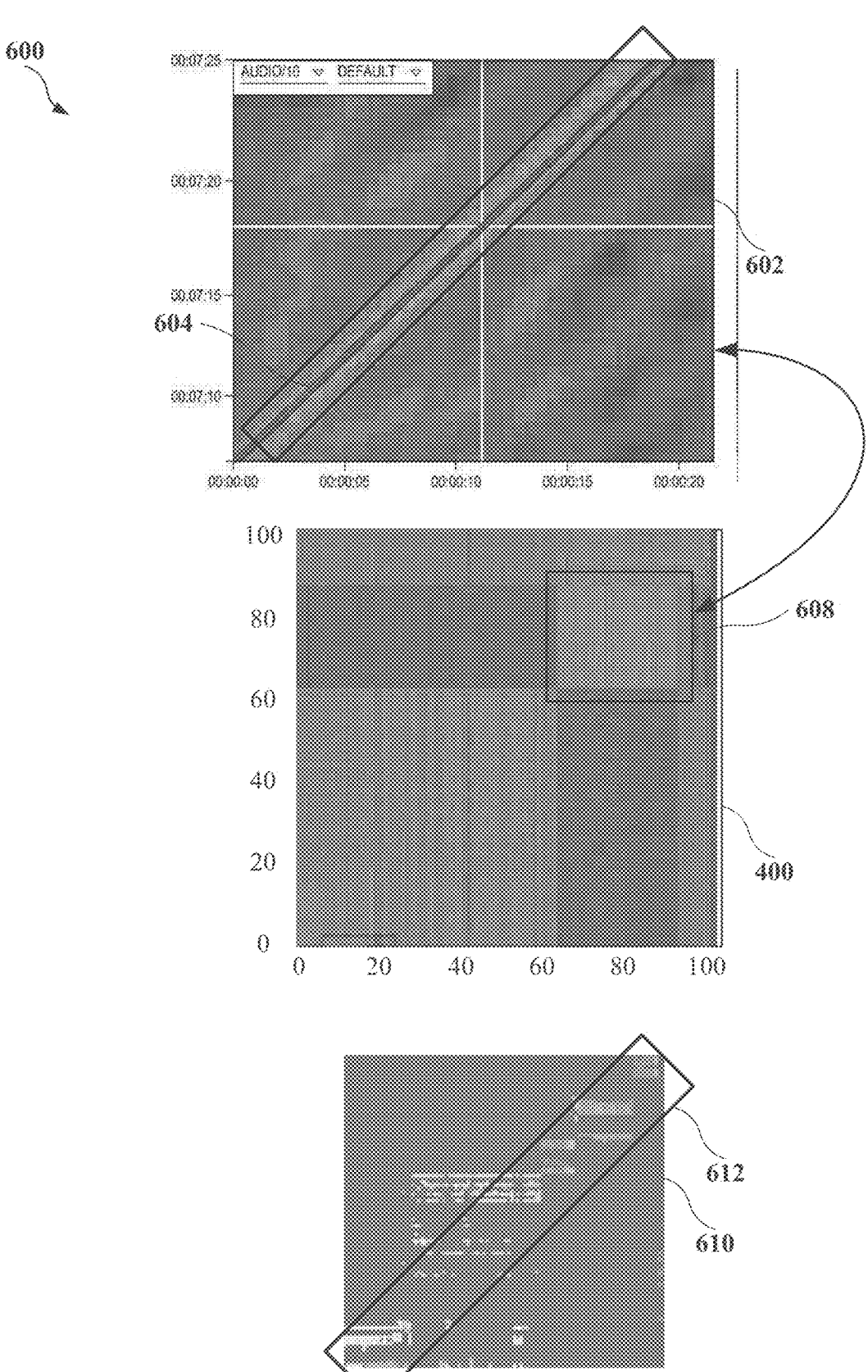
FIG. 6 illustrates visualizations of various heatmaps generated during execution of the technique of FIG. 5.

FIG. 6 illustrates visualizations 600 of various heatmaps generated during execution of the technique 500 of FIG. 5. FIG. 6 shows progressive analysis stages that may be performed by the match detection platform 102 of FIG. 1 when processing video content items for potential matches. The sequence of visualizations in FIG. 6 illustrates how the technique 500 progressively refines the analysis from initial audio matching through focused visual similarity assessment. This approach enables detection of matching content even when visual transformations make traditional matching techniques ineffective.

A heatmap portion 602 of an audio heatmap illustrates results of audio fingerprint comparison performed at step 514 of the technique 500. The heatmap portion 602 includes a diagonal pattern 604 indicating temporal alignment between matching audio segments in the compared video content items. In some implementations, this diagonal pattern 604 may appear as a continuous line or band of high similarity values. Alternative visualization schemes may represent this audio matching pattern using different visual indicators such as varying intensities, patterns, or textures.

The video similarity heatmap 400 (previously described with respect to FIG. 4) is reproduced herein for convenience to show a region of interest 608 (also region of interest 408 in FIG. 4) corresponding to the temporal location where audio matching was detected. This region of interest 608 represents the narrowed search space identified at step 520 and utilized at step 522 of technique 500. The region of interest 608 may be defined as a rectangular area encompassing the temporal bounds of the detected audio match, allowing analysis of visual similarity patterns in the vicinity of audio-matched segments.

A filtered similarity visualization 610 shows results after maintaining matches that meet specified match criteria at step 524 of technique 500. In some implementations, this visualization may retain only a top percentage (e.g., the top 5%) of similarity values within the region of interest 608. Alternative filtering approaches may employ different thresholds or criteria for maintaining potentially significant similarity values.

A match evidence visualization 612 illustrates the clustering of high similarity values along diagonal patterns within the filtered results, corresponding to step 526 of technique 500. The match evidence visualization 612 (e.g., a clustering pattern) may indicate sufficient visual evidence of matching content despite transformations that might affect traditional matching approaches. In some implementations, this visualization may employ various techniques to highlight clustering patterns such as density mapping or pattern enhancement.

FIG. 7 is a flowchart of an example of a technique associated with leveraging audio matches to improve visual matching recall between video content items. The technique 700 can be executed using computing devices, such as the systems, hardware, and software described with respect to FIGS. 1-6.

The technique 700 may identify matches between video content items even when one video content item has undergone visual transformations, such as non-central cropping, text or graphic overlays, or zoom transformations, by leveraging unmodified audio content to guide the visual matching process. For example, the match detection platform 102 may identify matching audio segments between videos and use this temporal alignment information to focus visual similarity analysis on specific regions, enabling detection of matches despite significant visual alterations.

The technique 700 can be executed using computing devices, such as the systems, hardware, and software described with respect to FIGS. 1-6. The technique 700 can be performed, for example, by executing a machine-readable program or other computer-executable instructions, such as routines, instructions, programs, or other code. The computer-executable instructions may be stored in a memory, such as the memory 204 of FIG. 4 and executed by a process, such as the processor 202 of FIG. 2. The steps, or operations, of the technique 700, or another technique, method, process, or algorithm described in connection with the implementations disclosed herein can be implemented directly in hardware, firmware, software executed by hardware, circuitry, or a combination thereof.

For simplicity of explanation, the technique 700 is depicted and described herein as a series of steps or operations. However, the steps or operations of the technique 700 can occur in various orders and/or concurrently. Additionally, other steps or operations not presented and described herein may be used. Furthermore, not all illustrated steps or operations may be required to implement a technique in accordance with the disclosed subject matter.

At 702, the technique 700 includes performing audio matching between a first video content item and a second video content item to identify a matching audio segment. For example, the match detection platform 102 may utilize the audio matching tool 110 to analyze audio components using various techniques such as audio fingerprinting, spectral analysis, or melody matching. In some implementations, the matching audio segment may be or include multiple non-contiguous audio segments within the first and second video content items. The audio matching may generate audio fingerprints for both video items and compare them to identify matching segments, as described earlier with respect to steps 512-516 of FIG. 5.

At 704, the technique 700 includes determining first temporal boundaries within the first video content item and second temporal boundaries within the second video content item corresponding to the identified matching audio segment. In some implementations, this may involve identifying start and end times of the matching audio segment within each video item and extending the temporal boundaries beyond these times by a predetermined interval to account for potential temporal misalignment. This boundary determination may be performed as described with respect to step 520 of FIG. 5.

At 706, the technique 700 includes performing visual matching between the first video content item within the first temporal boundaries and the second video content item within the second temporal boundaries. In some implementations, this may involve generating visual fingerprints for portions within the temporal boundaries and computing visual similarities between them. The visual matching may analyze complete columns and rows of a visual similarity heatmap at timepoints corresponding to the matching audio segment to determine whether high similarity values are concentrated along a diagonal band relative to surrounding areas.

The visual matching process may employ a modified visual similarity threshold that is lower than a baseline threshold used for standard visual matching without audio guidance. In some implementations, the process may involve analyzing a distribution of visual similarities relative to temporal alignment between the videos, including identifying a top predetermined percentage of highest visual similarity values and determining whether they are concentrated along the temporal alignment corresponding to the matching audio segment.

At 708, the technique 700 includes determining whether a match exists between the first and second video content items based on the visual matching. This determination may involve detecting a concentration of visual similarities along a temporal progression corresponding to the matching audio segment. In some implementations, the technique 700 may identify a percentage of visual similarities exceeding the modified threshold and compare it to a threshold percentage.

The technique 700 may maintain or have access to a database of reference video content items, with the second video content item being selected based on preliminary audio matching results. The visual matching may employ multiple visual feature extraction techniques, combining their results to determine visual similarity scores.

In some implementations, the first video content item may comprise a query video being checked for unauthorized use of content from the second video content item. As mentioned above, the technique 700 can be particularly effective in scenarios where visual content has undergone substantial modifications while maintaining similar audio content.

The visual matching process may involve generating a similarity matrix representing visual feature similarities between timepoints within the temporal boundaries (claim 9). This matrix may be analyzed to identify patterns indicating potential matches despite visual transformations.

Alternative implementations may employ different approaches for temporal boundary determination, such as using adaptive windowing techniques that respond to content complexity or variable playback rates. The visual similarity analysis may utilize various visualization schemes, pattern recognition algorithms, or machine learning techniques to identify matching content.

In some implementations, the technique 700 may output supplementary information along with match determinations, such as confidence scores, transformation characterizations, and temporal alignment data. This information may be used by downstream content management systems for various applications including rights management and content monetization.

FIG. 8 is a flowchart of an example of a technique 800 associated with leveraging audio matches to improve visual matching recall between video content items. The technique 800 can be executed using computing devices, such as the systems, hardware, and software described with respect to FIGS. 1-6. The technique 800 may identify matches between video content items even when one video has undergone visual transformations, such as non-central cropping, text or graphic overlays, or zoom transformations, by leveraging unmodified audio content to guide the visual matching process. For example, the match detection platform 102 may identify matching audio segments between videos and use this temporal alignment information to focus visual similarity analysis on specific regions, enabling detection of matches despite significant visual alterations.

The technique 800 can be executed using computing devices, such as the systems, hardware, and software described with respect to FIGS. 1-6. The technique 800 can be performed, for example, by executing a machine-readable program or other computer-executable instructions, such as routines, instructions, programs, or other code. The computer-executable instructions may be stored in a memory, such as the memory 204 of FIG. 4 and executed by a process, such as the processor 202 of FIG. 2. The steps, or operations, of the technique 800, or another technique, method, process, or algorithm described in connection with the implementations disclosed herein can be implemented directly in hardware, firmware, software executed by hardware, circuitry, or a combination thereof.

For simplicity of explanation, the technique 800 is depicted and described herein as a series of steps or operations. However, the steps or operations of the technique 800 can occur in various orders and/or concurrently. Additionally, other steps or operations not presented and described herein may be used. Furthermore, not all illustrated steps or operations may be required to implement a technique in accordance with the disclosed subject matter.

At 802, the technique 800 includes performing audio matching between a first video content item and a second video content item to identify a matching audio segment. For example, the match detection platform 102 may utilize the audio matching tool 110 to analyze audio components using various techniques such as audio fingerprinting, spectral analysis, or melody matching. In some implementations, the matching audio segment may include multiple non-contiguous audio segments within the first and second video content items. The audio matching may generate audio fingerprints for both video items and compare them to identify matching segments, as described earlier with respect to steps 512-516 of FIG. 5.

At 804, the technique 800 includes generating visual similarity values between portions of the first and second video content items corresponding to the matching audio segment. Generating the visual similarity values may include generating visual fingerprints for portions of the first video content item and the second video content item corresponding to the matching audio segment; and computing similarities between the generated visual fingerprints.

In some implementations, this may involve generating visual fingerprints for portions of the first video content item and the second video content item within the temporal boundaries identified through audio matching. The visual similarity values may be computed using various distance metrics or similarity measures between the generated fingerprints. Alternative implementations may employ different comparison techniques such as template matching, feature correlation analysis, or transformation-tolerant matching approaches that can identify corresponding content despite modifications such as non-central cropping, overlays, or zoom effects.

At 806, the technique 800 includes selecting a top predetermined percentage of highest visual similarity values from the generated visual similarity values. For example, as described with respect to the heatmap visualizations in FIG. 6, the technique may retain only the top percentage (e.g., top 5%) of similarity values within the region corresponding to the matching audio segment. In some implementations, this filtering step helps focus the analysis on the most promising potential matches while acknowledging that overall similarity values may be lower due to visual transformations. Alternative filtering approaches may employ different thresholds or criteria for maintaining potentially significant similarity values.

At 808, the technique 800 includes performing a concentration analysis to determine whether the selected top predetermined percentage of the highest visual similarity values are concentrated in a diagonal pattern along a temporal alignment corresponding to the matching audio segment. This analysis may involve examining whether the retained high similarity values cluster along diagonal bands in the heatmap that align with the temporal progression identified through audio matching. The concentration analysis may employ various techniques such as density estimation, pattern recognition, or statistical analysis of similarity value distributions. Alternative implementations may use different analytical approaches to identify and characterize clustering patterns or employ multi-stage analysis processes that combine both local and global similarity patterns. Performing the concentration analysis may include generating a visual similarity heatmap representing the visual similarity values; analyzing columns and rows of the visual similarity heatmap at timepoints corresponding to the matching audio segment; and determining whether the top predetermined percentage of highest visual similarity values form clusters along diagonal bands within the analyzed columns and rows.

At 810, the technique 800 includes determining a match between the first and second video content items based on the concentration analysis. This determination may involve evaluating whether the concentration of high similarity values along the temporal alignment meets certain criteria or thresholds that indicate a likely match. In some implementations, the match determination may consider factors such as the density of high similarity values, the continuity of diagonal patterns, or the strength of local matches within the context of the identified audio correspondence. The determination process may employ various decision criteria or evaluation approaches to balance detection sensitivity with accuracy. In an example, determining the match may include identifying a percentage of the visual similarity values that exceed a modified visual similarity threshold that is lower than a baseline visual similarity threshold; and comparing the identified percentage to a threshold percentage.

The matching audio segment may include multiple non-contiguous audio segments within the first and second video content items, and the temporal alignment may include multiple diagonal patterns corresponding to the multiple non-contiguous audio segments.

In some implementations, the technique 800 may maintain or have access to a database of reference video content items, with the second video content item being selected based on preliminary audio matching results. The visual matching may employ multiple visual feature extraction techniques, combining their results to determine visual similarity scores. Alternative implementations may utilize different approaches for temporal boundary determination, such as using adaptive windowing techniques that respond to content complexity or variable playback rates.

The technique 800 may be particularly effective in scenarios where visual content has undergone substantial modifications while maintaining similar audio content. For example, the first video content item may comprise a query video being checked for unauthorized use of content from the second video content item. The visual similarity analysis may utilize various visualization schemes, pattern recognition algorithms, or machine learning techniques to identify matching content despite transformations.

In some implementations, the technique 800 may include determining temporal boundaries within the first and second video content items corresponding to the matching audio segment, where generating the visual similarity values is limited to portions of the first and second video content items within the determined temporal boundaries. Determining the temporal boundaries may include identifying start and end times of the matching audio segment within each of the first and second video content items; and extending the temporal boundaries beyond the identified start and end times by a predetermined time interval to account for temporal misalignment.

In some implementations, the technique 800 may output supplementary information along with match determinations, such as confidence scores, transformation characterizations, and temporal alignment data. This information may be used by downstream content management systems for various applications including rights management, content monetization, or content tracking purposes. The supplementary information may include detailed match reports with visualizations of matching regions, analysis of modification patterns, and temporal mapping between the compared content items.

Alternative implementations of the technique 800 may incorporate additional processing steps, different analysis methods, or variations in the specific approaches used for audio matching, visual similarity computation, or match determination. For example, some implementations may employ adaptive thresholding techniques that adjust based on content characteristics, or utilize multi-modal analysis approaches that combine evidence from multiple feature types. The technique may also be integrated with existing matching systems to provide complementary detection capabilities, particularly for cases where traditional visual matching methods may be less effective due to content modifications.

Some implementations are described below as numbered examples (Example 1, 2, 3, etc.). These examples are provided as examples only and do not limit the other implementations disclosed herein.

Example 1 is a method that includes performing an audio matching between a first video content item and a second video content item to identify a matching audio segment; determining first temporal boundaries within the first video content item and second temporal boundaries within the second video content item corresponding to the identified matching audio segment; performing a visual matching between the first video content item within the first temporal boundaries and the second video content item within the second temporal boundaries using a modified visual similarity threshold that is lower than a baseline visual similarity threshold; and determining whether a match exists between the first and second video content items based on the visual matching.

Example 2 is the method of Example 1, where performing the visual matching includes analyzing columns and rows of a visual similarity heatmap at timepoints corresponding to the matching audio segment; and determining whether high similarity values are concentrated along a diagonal band within the columns and the rows relative to surrounding areas of the visual similarity heatmap.

Example 3 is the method of Example 1, where performing the visual matching includes generating visual fingerprints for portions of the first video content item and the second video content item within respective first temporal boundaries and the second temporal boundaries; and computing visual similarities between the visual fingerprints.

Example 4 is the method of Example 3, where performing the visual matching includes analyzing a distribution of the visual similarities relative to temporal alignment between the first and second video content items.

Example 5 is the method of Example 4, where analyzing the distribution includes identifying a top predetermined percentage of highest visual similarity values; and determining whether the top predetermined percentage of similarity values are concentrated along a temporal alignment corresponding to the matching audio segment.

Example 6 is the method of Example 3, where determining whether the match exists includes detecting a concentration of the visual similarities along a temporal progression corresponding to the matching audio segment.

Example 7 is the method of Example 1, where the matching audio segment includes multiple non-contiguous audio segments within the first and second video content items.

Example 8 is a system that includes one or more memories; and one or more processors, the one or more processors configured to execute instructions stored in the one or more memories to perform an audio matching between a first video content item and a second video content item to identify a matching audio segment; determine first temporal boundaries within the first video content item and second temporal boundaries within the second video content item corresponding to the identified matching audio segment; perform a visual matching between the first video content item within the first temporal boundaries and the second video content item within the second temporal boundaries using a modified visual similarity threshold that is lower than a baseline visual similarity threshold; and determine whether a match exists between the first and second video content items based on the visual matching.

Example 9 is the system of Example 8, where to perform the visual matching includes instructions to analyze columns and rows of a visual similarity heatmap at timepoints corresponding to the matching audio segment; and determine whether high similarity values are concentrated along a diagonal band within the columns and the rows relative to surrounding areas of the visual similarity heatmap.

Example 10 is the system of Example 8, where to perform the visual matching includes instructions to generate visual fingerprints for portions of the first video content item and the second video content item within respective first temporal boundaries and the second temporal boundaries; and compute visual similarities between the visual fingerprints.

Example 11 is the system of Example 10, where to perform the visual matching includes instructions to analyze a distribution of the visual similarities relative to temporal alignment between the first and second video content items.

Example 12 is the system of Example 11, where to analyze the distribution includes instructions to identify a top predetermined percentage of highest visual similarity values; and determine whether the top predetermined percentage of similarity values are concentrated along a temporal alignment corresponding to the matching audio segment.

Example 13 is the system of Example 10, where to determine whether the match exists includes instructions to detect a concentration of the visual similarities along a temporal progression corresponding to the matching audio segment.

Example 14 is the system of Example 8, where to determine the first temporal boundaries and the second temporal boundaries includes instructions to identify start and end times of the matching audio segment within each of the first and second video content items; and extend the temporal boundaries beyond the start and end times by a predetermined time interval.

Example 15 is the system of Example 8, where to determine whether the match exists includes instructions to identify a percentage of visual similarities that exceed the modified visual similarity threshold; and compare the percentage to a threshold percentage.

Example 16 is the system of Example 8, where the first video content item includes a query video being checked for unauthorized use of content from the second video content item.

Example 17 is one or more non-transitory computer readable media storing instructions operable to cause one or more processors to perform operations including performing an audio matching between a first video content item and a second video content item to identify a matching audio segment; determining first temporal boundaries within the first video content item and second temporal boundaries within the second video content item corresponding to the identified matching audio segment; performing a visual matching between the first video content item within the first temporal boundaries and the second video content item within the second temporal boundaries using a modified visual similarity threshold that is lower than a baseline visual similarity threshold; and determining whether a match exists between the first and second video content items based on the visual matching.

Example 18 is the one or more non-transitory computer readable media of Example 17, where performing the visual matching includes analyzing columns and rows of a visual similarity heatmap at timepoints corresponding to the matching audio segment; and determining whether high similarity values are concentrated along a diagonal band within the columns and the rows relative to surrounding areas of the visual similarity heatmap.

Example 19 is the one or more non-transitory computer readable media of Example 17, where performing the visual matching includes generating visual fingerprints for portions of the first video content item and the second video content item within respective first temporal boundaries and the second temporal boundaries; and computing visual similarities between the visual fingerprints.

Example 20 is the one or more non-transitory computer readable media of Example 19, where performing the visual matching includes analyzing a distribution of the visual similarities relative to temporal alignment between the first and second video content items.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same embodiment or implementation unless described as such.

Implementations of leveraging audio matches to improve visual matching recall between video content items can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

Further, in one aspect, for example, leveraging audio matches to improve visual matching recall between video content items can be implemented using a general purpose computer or general purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described embodiments, implementations, and aspects have been described in order to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method, comprising:
    performing an audio matching between a first video content item and a second video content item to identify a matching audio segment;
    determining first temporal boundaries within the first video content item and second temporal boundaries within the second video content item corresponding to the identified matching audio segment;
    performing a visual matching between the first video content item within the first temporal boundaries and the second video content item within the second temporal boundaries using a modified visual similarity threshold that is lower than a baseline visual similarity threshold; and
    determining whether a match exists between the first and second video content items based on the visual matching.

2. The method of claim 1, wherein performing the visual matching comprises:
    analyzing columns and rows of a visual similarity heatmap at timepoints corresponding to the matching audio segment; and
    determining whether high similarity values are concentrated along a diagonal band within the columns and the rows relative to surrounding areas of the visual similarity heatmap.

3. The method of claim 1, wherein performing the visual matching comprises:
    generating visual fingerprints for portions of the first video content item and the second video content item within respective first temporal boundaries and the second temporal boundaries; and computing visual similarities between the visual fingerprints.

4. The method of claim 1, wherein the matching audio segment comprises multiple non-contiguous audio segments within the first and second video content items.

5. The method of claim 3, wherein performing the visual matching comprises analyzing a distribution of the visual similarities relative to temporal alignment between the first and second video content items.

6. The method of claim 3, wherein determining whether the match exists comprises detecting a concentration of the visual similarities along a temporal progression corresponding to the matching audio segment.

7. The method of claim 5, wherein analyzing the distribution comprises: identifying a top predetermined percentage of highest visual similarity values; and determining whether the top predetermined percentage of similarity values are concentrated along a temporal alignment corresponding to the matching audio segment.

8. A system, comprising:

one or more memories; and one or more processors, the one or more processors configured to execute instructions stored in the one or more memories to:

perform an audio matching between a first video content item and a second video content item to identify a matching audio segment;

determine first temporal boundaries within the first video content item and second temporal boundaries within the second video content item corresponding to the identified matching audio segment;

perform a visual matching between the first video content item within the first temporal boundaries and the second video content item within the second temporal boundaries using a modified visual similarity threshold that is lower than a baseline visual similarity threshold; and determine whether a match exists between the first and second video content items based on the visual matching.

9. The system of claim 8, wherein to perform the visual matching comprises instructions to:

analyze columns and rows of a visual similarity heatmap at timepoints corresponding to the matching audio segment; and determine whether high similarity values are concentrated along a diagonal band within the columns and the rows relative to surrounding areas of the visual similarity heatmap.

10. The system of claim 8, wherein to perform the visual matching comprises instructions to:

generate visual fingerprints for portions of the first video content item and the second video content item within respective first temporal boundaries and the second temporal boundaries; and compute visual similarities between the visual fingerprints.

11. The system of claim 8, wherein to determine the first temporal boundaries and the second temporal boundaries comprises instructions to:

identify start and end times of the matching audio segment within each of the first and second video content items; and extend the temporal boundaries beyond the start and end times by a predetermined time interval.

12. The system of claim 8, wherein to determine whether the match exists comprises instructions to:

identify a percentage of visual similarities that exceed the modified visual similarity threshold; and compare the percentage to a threshold percentage.

13. The system of claim 8, wherein the first video content item comprises a query video being checked for unauthorized use of content from the second video content item.

14. The system of claim 10, wherein to perform the visual matching comprises instructions to:

analyze a distribution of the visual similarities relative to temporal alignment between the first and second video content items.

15. The system of claim 10, wherein to determine whether the match exists comprises instructions to:

detect a concentration of the visual similarities along a temporal progression corresponding to the matching audio segment.

16. The system of claim 14, wherein to analyze the distribution comprises instructions to:

identify a top predetermined percentage of highest visual similarity values; and determine whether the top predetermined percentage of similarity values are concentrated along a temporal alignment corresponding to the matching audio segment.

17. One or more non-transitory computer readable media storing instructions operable to cause one or more processors to perform operations comprising:

performing an audio matching between a first video content item and a second video content item to identify a matching audio segment;

determining first temporal boundaries within the first video content item and second temporal boundaries within the second video content item corresponding to the identified matching audio segment;

performing a visual matching between the first video content item within the first temporal boundaries and the second video content item within the second temporal boundaries using a modified visual similarity threshold that is lower than a baseline visual similarity threshold; and determining whether a match exists between the first and second video content items based on the visual matching.

18. The one or more non-transitory computer readable media of claim 17, wherein performing the visual matching comprises:

analyzing columns and rows of a visual similarity heatmap at timepoints corresponding to the matching audio segment; and determining whether high similarity values are concentrated along a diagonal band within the columns and the rows relative to surrounding areas of the visual similarity heatmap.

19. The one or more non-transitory computer readable media of claim 17, wherein performing the visual matching comprises:

generating visual fingerprints for portions of the first video content item and the second video content item within respective first temporal boundaries and the second temporal boundaries; and computing visual similarities between the visual fingerprints.

20. The one or more non-transitory computer readable media of claim 19, wherein performing the visual matching comprises analyzing a distribution of the visual similarities relative to temporal alignment between the first and second video content items.

* * * * *